Figure 1:
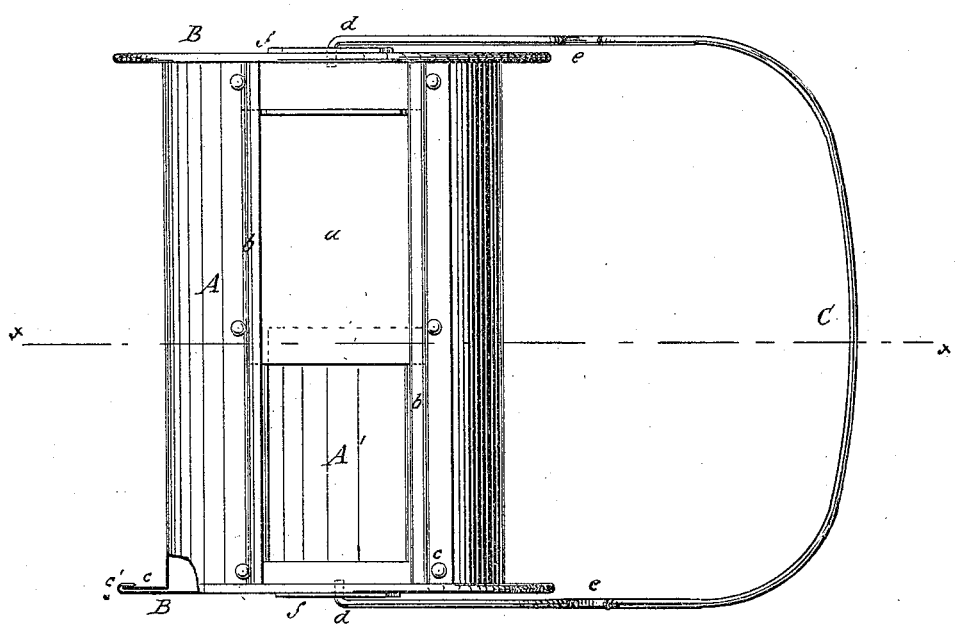

R. DAVIS.
Coffee-Roaster.

No. 212,445. Patented Feb. 18, 1879.

WITNESSES:
Chas Nida
C. Sedgwick

INVENTOR:
R. Davis
BY
ATTORNEYS.

UNITED STATES PATENT OFFICE.

RACHEL DAVIS, OF OMAHA, NEBRASKA.

IMPROVEMENT IN COFFEE-ROASTERS.

Specification forming part of Letters Patent No. 212,445, dated February 18, 1879; application filed November 27, 1878.

*To all whom it may concern:*

Be it known that I, RACHEL DAVIS, of Omaha, in the county of Douglas and State of Nebraska, have invented a new and Improved Coffee-Roaster, of which the following is a specification:

The object of this invention is to provide a coffee-roaster for domestic use, constructed in such a way that the body of the cylinder, in which the coffee is placed, and the handle for moving the same, are kept from immediate contact with the hot oven or stove-top during the roasting, and thus the liability of the coffee becoming burned is avoided.

It consists of a hollow cylinder or drum, with a door to pass the coffee through, and having flanged heads, pivoted to a handle, so that it can be rotated, the said handle having a bend in it, forming a support, that keeps it in a horizontal position and out of contact with the heated stove or oven, whereby when the roaster is in use it is sustained on the flanged heads, and by means of the handle can be rolled back and forth on the stove-top or oven-bottom, with the cylindrical receptacle out of contact therewith.

Referring to the drawings, A represents a hollow cylinder, having an opening, A′, in its surface, about one-eighth of its circumference in width and about one-half of its length. Flanges *b b* are placed on each side of this opening, parallel with its edges, and extending the whole length of the cylinder between its heads. *a* is a door for covering opening A′, slightly longer than the opening, which is held under the flanges *b b* on either side, and slides freely back and forth, covering and uncovering the opening. The ends of the cylinder are turned out at right angles, forming flanges *c*. Over the two ends are placed the heads B B against the flanges *c*, the periphery of the said heads being turned over, forming lips *c′*, which clasp the flanges *c*, and thus hold the heads in place. The diameter of heads B is from one-half to one inch greater than that of cylinder A, which is thus, when placed in a horizontal position, raised above the surface on which the roaster is placed.

Figure 2:
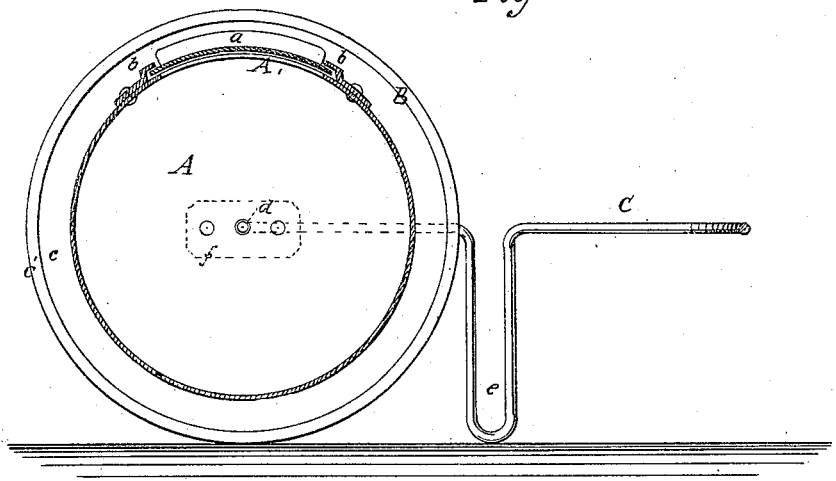

C represents a handle or bail. The ends of this handle are bent toward each other at right angles, and inserted in holes in the center of the heads, forming the pivots *d*, on which the cylinder revolves freely. Just outside the heads B each arm of this handle is provided with downward-projecting right-angular bend *e*, forming rests, which support the handle in a horizontal position, as clearly shown in Figure 2. To give stiffness to the heads where the pivotal holes are made, perforated plates *f* are riveted on them.

The operation of my improvement is as follows: The coffee to be roasted is placed in the hollow cylinder through opening A′, which is then closed by the door *a*. The cylinder is then placed on the floor of the oven, its flanged heads sustaining it above the floor. To stir up the coffee and expose all of it to the heat, it is rolled back and forth by means of the handle C.

As the body of the cylinder (the receptacle of the coffee) is not in contact with the bottom of the oven, it being supported on the flanged heads, it follows that there will be no excessive heating of any part of it, and thus there is no liability of the coffee being burned.

I am aware that it is not broadly new to provide the roasting-chamber of a coffee-roaster with flanged heads.

I am also aware that the handle of a coffee-roaster has been provided with a screen-plate, for keeping the heat from the hand of the operator; but

What I claim, and desire to secure by Letters Patent, is—

The herein-described coffee-roaster, consisting of the cylinder A, provided with the flanged heads B, to prevent the body of the said cylinder from coming in direct contact with oven or stove-top, and with the bail or handle C, for rotating the same, the said handle being provided with right-angular bend *e*, which supports it in a horizontal position, substantially as herein shown and described.

RACHEL DAVIS.

Witnesses:
ALLEN R. POFF,
S. A. RICE.